United States Patent
Fan et al.

(10) Patent No.: US 6,973,213 B2
(45) Date of Patent: Dec. 6, 2005

(54) BACKGROUND-BASED IMAGE SEGMENTATION

(75) Inventors: Zhigang Fan, Webster, NY (US); Hui Cheng, Bridgewater, NJ (US)

(73) Assignee: Xerox Corporation, Stamford, CT (US)

( * ) Notice: Subject to any disclaimer, the term of this patent is extended or adjusted under 35 U.S.C. 154(b) by 740 days.

(21) Appl. No.: 09/977,186

(22) Filed: Oct. 12, 2001

(65) Prior Publication Data

US 2003/0072487 A1 Apr. 17, 2003

(51) Int. Cl.[7] .................................. G06K 9/34
(52) U.S. Cl. .................................. 382/176
(58) Field of Search .................. 382/173–179, 382/164–165, 170–171, 254–260, 298–300, 382/101, 180–187, 224–225, 190–208; 358/1.9, 358/2.1, 296, 462–467

(56) References Cited

U.S. PATENT DOCUMENTS

| | | | |
|---|---|---|---|
| 5,737,438 A * | 4/1998 | Zlotnick et al. | 382/101 |
| 5,767,978 A | 6/1998 | Revankar et al. | 398/296 |
| 5,956,468 A * | 9/1999 | Ancin | 358/1.9 |
| 6,453,074 B1 * | 9/2002 | Zheng | 382/260 |
| 6,504,955 B2 * | 1/2003 | Oomura et al. | 382/173 |

* cited by examiner

Primary Examiner—Bhavesh M. Mehta
Assistant Examiner—Ishrat Sherali
(74) Attorney, Agent, or Firm—Fay, Sharpe, Fagan, Minnich & McKee, LLP (57) ABSTRACT

A method for segmenting an image using a background-based segmentation process is provided. A document image (102) is low-pass filtered and decimated. The decimated image is processed at low resolution by a low-resolution segmentation (104) stage. Segmentation results include identification of a main background and one or more objects. Objects that cannot be classified in text or picture classes are further segmented into a local background and smaller objects. This process is reiterated until all objects are classified in text or picture classes. The results are overlaid on the image (102) during an original-resolution refinement (106) stage to refine the segmentation.

11 Claims, 10 Drawing Sheets

BACKGROUND-BASED IMAGE SEGMENTATION

BACKGROUND OF THE INVENTION

The present invention relates to image processing. It finds particular application in conjunction with segmentation of images into a main background, local backgrounds, text objects, and picture objects, and will be described with particular reference thereto. However, it is to be appreciated that the present invention is also amenable to other like applications.

Document images generally contain multiple regions with each region exhibiting distinct properties. To process document images containing multiple regions accurately, different algorithms should be applied to each type of region. For example, text regions need to be sharpened before being printed. However, halftone pictures need to be low-pass filtered first to avoid moiré. Therefore, a document image generally needs to be segmented into its constituent regions before image processing techniques can be applied most effectively. However, most existing segmentation algorithms are designed for specific image processing applications, such as enhancement, rendering, or compression. Depending on the application, segmentation of the same image may be very different. For compression, lines in graphics can be treated the same as text strokes. But for editing, graphics should be treated as a whole, like picture regions, instead of being broken into foreground and background, like text regions. Since an image processing system often includes many of these applications, multiple segmentations may need to be computed. Therefore, it is desirable to develop a segmentation algorithm that is suitable for many, if not all, image processing applications.

The present invention contemplates new and improved methods for segmenting images that overcome the above-referenced problems and others.

SUMMARY OF THE INVENTION

The present invention provides a background-based image segmentation process. In accordance with one aspect of the invention, the process is comprised of the following step: a) segmenting an image into a main background, a local background, and a first object, wherein the first object is on either the main background or the local background.

In accordance with another aspect of the invention, the process is comprised of the following steps: a) performing low-resolution segmentation of an image into a main background, a local background, and a first object, wherein the first object is on either the main background or the local background; and b) refining the borders shared by any two of the main background, the local background, and the first object at the original resolution of the image.

In accordance with another aspect of the invention, a method for segmenting an image into a main background, local backgrounds, and objects is provided. The method is comprised of the following steps: a) identifying a main background for the image; b) identifying a first object on the main background; c) classifying the first object into one of a group of classes consisting of a text object, a picture object, and a composite object; and d) if the first object is classified as a composite object, identifying a local background for the first object.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
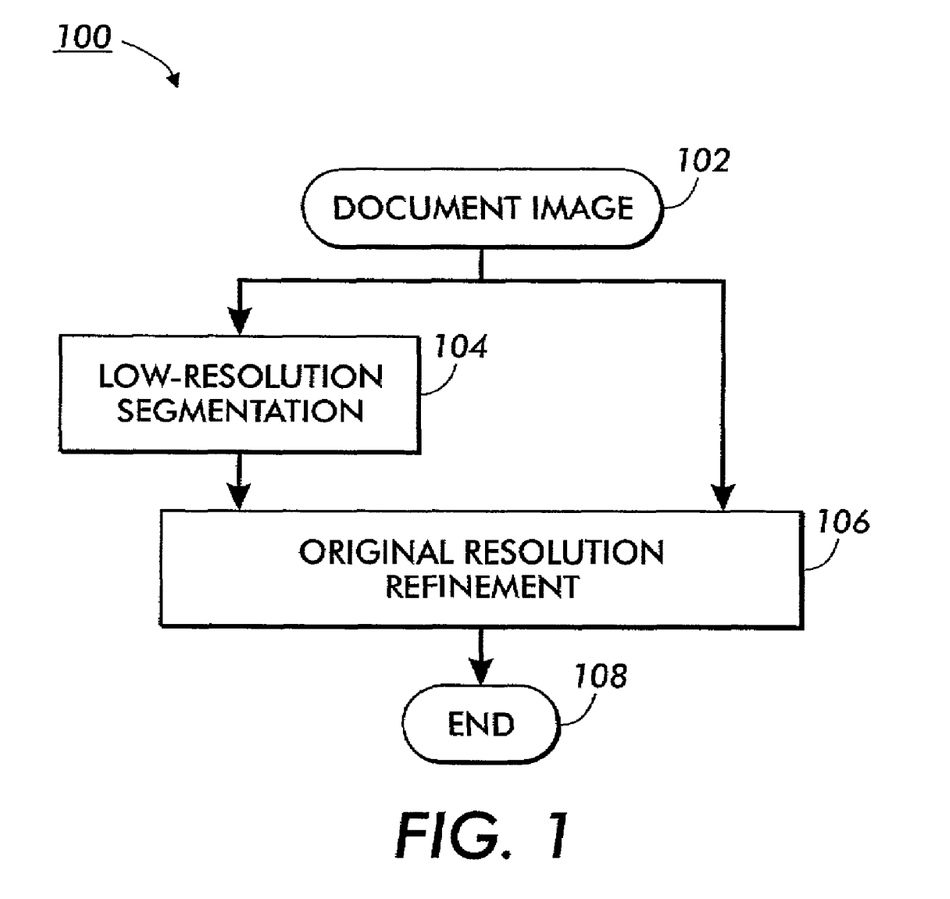
FIG. 1 is a flowchart of the background-based segmentation process 100 in accordance with the present invention.

With reference to FIG. 1, a flowchart of the background-based segmentation process 100 in accordance with the present invention is provided. The background-based segmentation process 100 is designed for segmentation of high-resolution document images 102. However, background detection and segmentation at high resolution is computationally expensive, and the result is sensitive to halftone noise. In order to reduce computational complexity and suppress halftone noise, the image 102 is processed at two different resolutions (i.e., low-resolution and original-resolution). The background-based segmentation process 100 is also useful in segmenting lower resolution document images. Those skilled in the art will recognize that redundancies or unnecessary processes may arise as the original resolution of the document image is lowered.

The process 100 begins with a document image 102 to be segmented. Next, the image 102 is low-pass filtered and decimated. Then it is processed at low resolution by the low-resolution segmentation stage 104. Segmentation results include identification of a main background and one or more objects. Objects that cannot be classified in text or picture classes are further segmented into a local background and smaller objects. This process is reiterated until all objects are classified in text or picture classes. Next, the results of the segmentation stage 104 are overlaid on the image 102 during the original-resolution refinement stage 106 of the process to refine the segmentation results. When the refinement stage 106 is complete, the segmentation process 100 for the image 102 is at its end 108.

Figure 2:
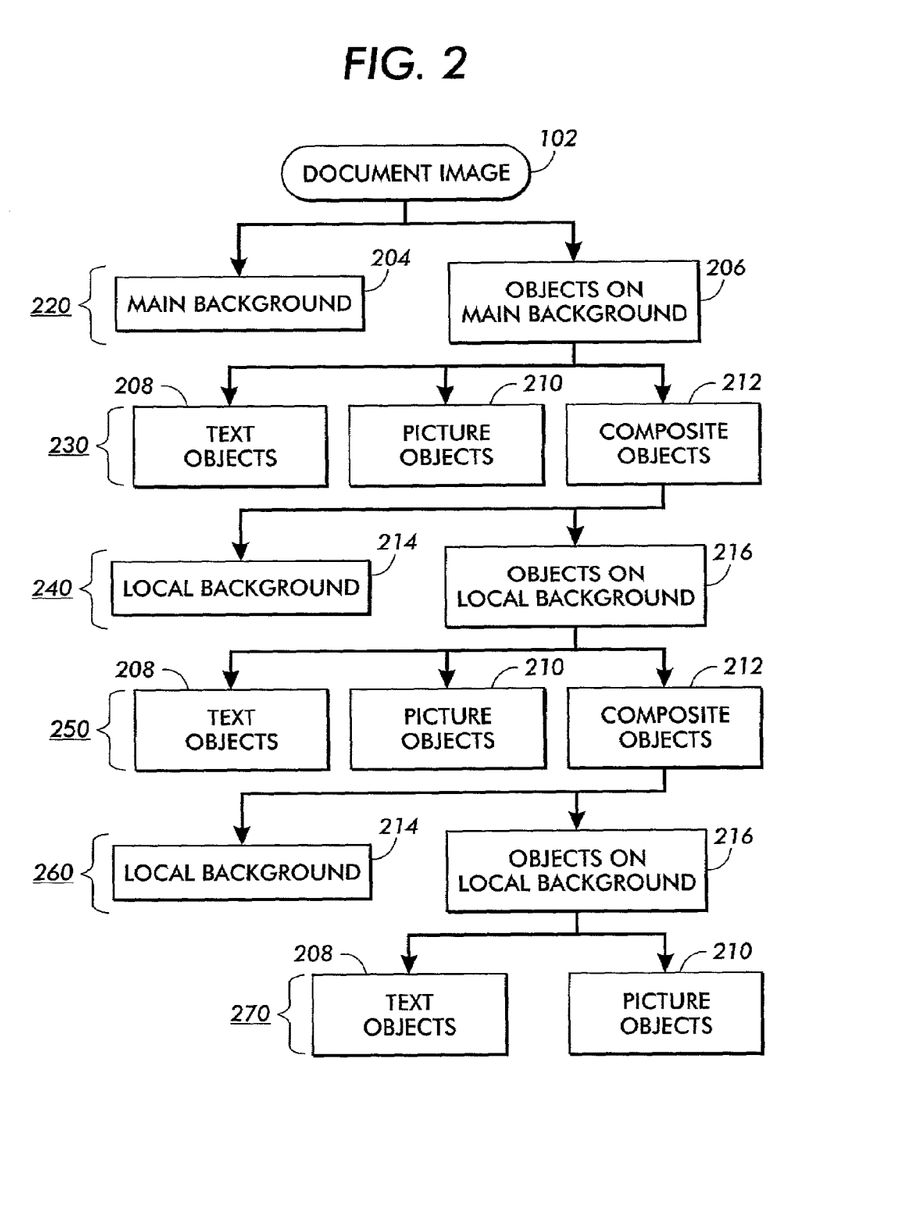
FIG. 2 is a diagram of an example of segmentation results from the background-based segmentation process 100 of FIG. 1.

With reference to FIG. 2, an example of results from the background-based segmentation process 100 of FIG. 1 is provided. The segmentation process identifies a main background, local backgrounds, and objects and further classifies the objects into text or picture classes. The results shown in FIG. 2 indicate that the document image 102 was segmented into a main background 204, two local backgrounds 214, text objects 208, and picture objects 210. The hierarchy of the diagram reflects multiple levels in the segmentation of the image 102 (i.e., 220, 230, 240, 250, 260, and 270).

At 220, the diagram shows that the main background 204 and objects on the main background 206 were identified. At 230, the diagram shows that the objects on the main background 206 were classified into text objects 208, picture objects 210, and a composite object 212. A composite object 212 is simply an object that does not meet the criteria required for classification as a text object 208 or a picture object 210. At 240, the diagram shows that the composite object 212 was further segmented into a local background 214 and objects on the local background 216. At 250, like at 230, the diagram shows that the objects on the local background 216 were classified into text objects 208, picture objects 210, and a composite object 212. At 260, like at 240, the diagram shows that the composite object 212 was further segmented into a local background 214 and objects on the local background 216. At 270, the diagram shows that the objects on the local background 216 were classified into text objects 208 and picture objects 210. Note that no composite objects remained at 270, hence no further identification of local backgrounds was required and the segmentation process was complete.

Figure 3:
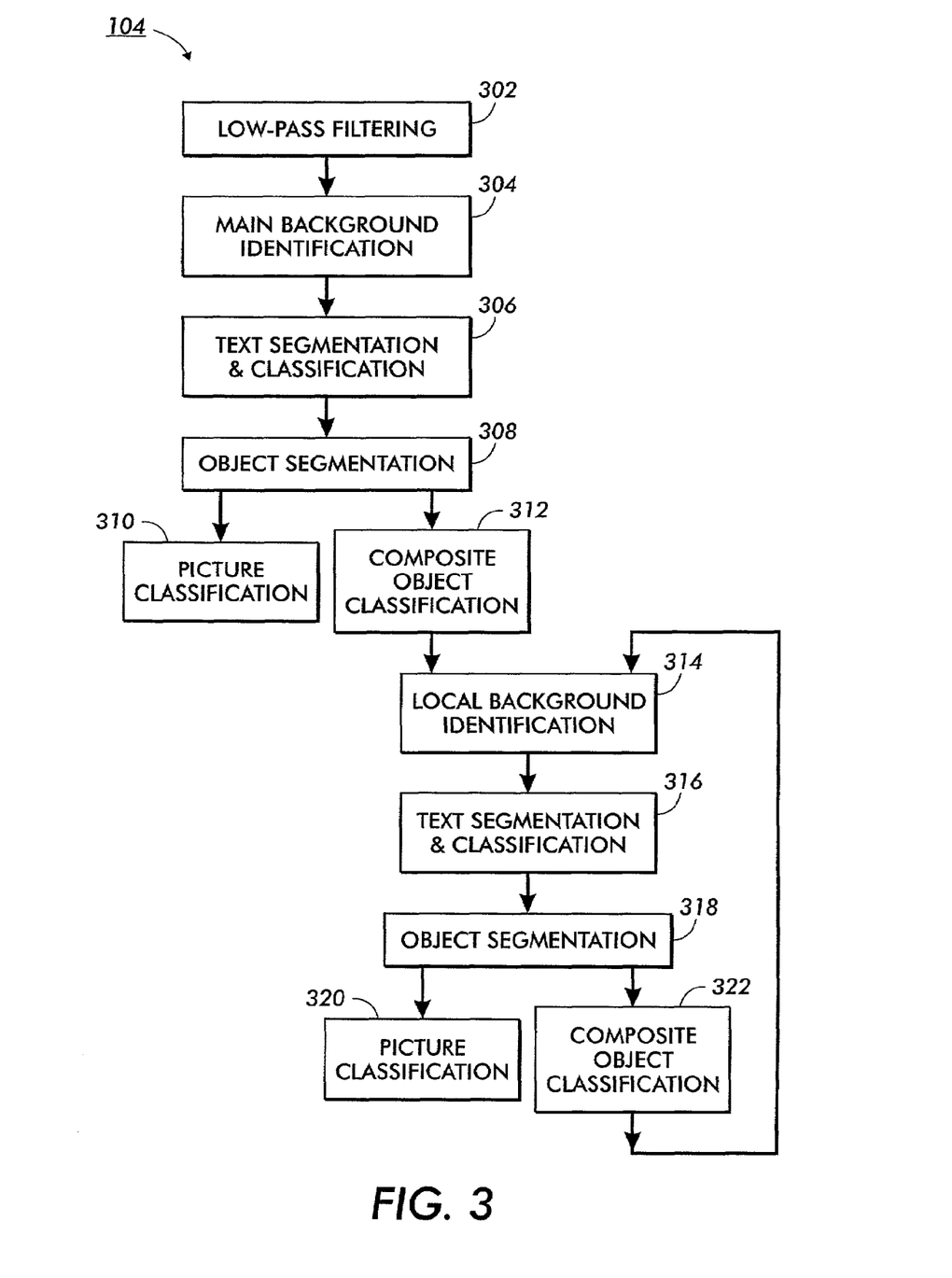
FIG. 3 is a flowchart of the low-resolution segmentation 104 stage of the background-based segmentation process 100 of FIG. 1.

With reference to FIG. 3, a flowchart of the low-resolution segmentation 104 stage of the background-based segmentation process 100 of FIG. 1 is provided. The low-resolution segmentation 104 stage begins by low-pass filtering and decimating 302 the document image 102 to create a low-resolution representation of the image 102 (i.e., a decimated image). Next, a main background is identified 304. Text objects on the main background are identified, segmented, and classified 306. Other objects on the main background are also identified and segmented 308. The other objects are then classified into the picture class 310 or the composite object class 312.

When a composite object is identified, it is further segmented. First, a local background is identified 314. Next, like in 306, text objects on the local background are identified, segmented, and classified 316. Other objects on the local background are also identified and segmented 308. The other objects are then classified into the picture class 320 or composite object class 322. At this point, segmentation continues for any remaining composite objects by returning to 314. When no further composite objects are identified, the segmentation process 100 proceeds to the original-resolution refinement 106 stage.

Figure 4:
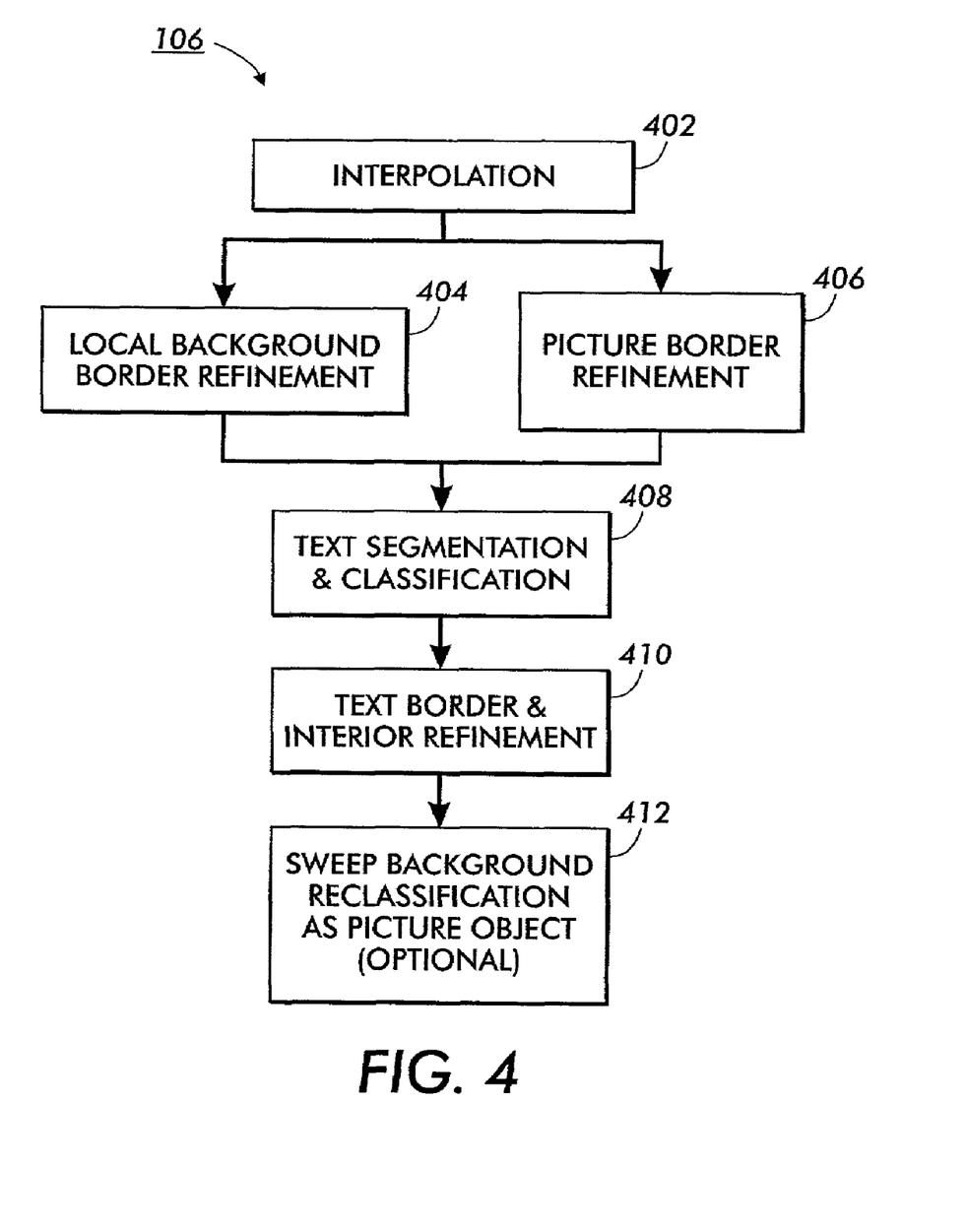
FIG. 4 is a flowchart of the original-resolution refinement 106 stage of the background-based segmentation process 100 of FIG. 1.

With reference to FIG. 4, a flowchart of the original-resolution refinement 106 stage of the background-based segmentation process 100 of FIG. 1 is provided. Refinement 106 begins by overlaying the segmentation and classification results of the low-resolution segmentation 104 stage on the original image 102. This is accomplished by interpolation 402 of the segmentation and classification results from the decimated image to the original resolution of the image 102. The border of each local background 404 and each picture object 406 are refined at the original resolution with respect to the main background and other adjacent backgrounds and objects. Text objects are identified, segmented, and classified 408. The border and interior areas surrounded by text character strokes are refined for each text object 410. An optional refinement is the reassessment of each background to determine if it is a sweep and, if so, reclassification as a picture object 412. If maintaining the gradient characteristics of the sweep is important, the option 412 should be included. If the option 412 is not included, the background will reflect the mean color for its area. If the option 412 is implemented, any background identified as a sweep is reclassified as a picture object and continues to reflect its gradient characteristics. When all refinements are performed, the refinement 106 stage is complete and the segmentation process 100 is at its end 108 (FIG. 1).

With reference to FIGS. 5–10, a detailed flowchart of the background-based segmentation process 100 of FIG. 1 is provided. As in FIG. 1, the process 100 begins in FIG. 5 with a document image 102 to be segmented. Next, the image 102 is low-pass filtered and decimated 302 to create a low-resolution version of the image. After the image 102 is decimated, the amount of image data and halftone noise is much reduced. Therefore, simple and efficient algorithms can be used to segment the image, especially to identify the main background and local backgrounds.

Figure 5:
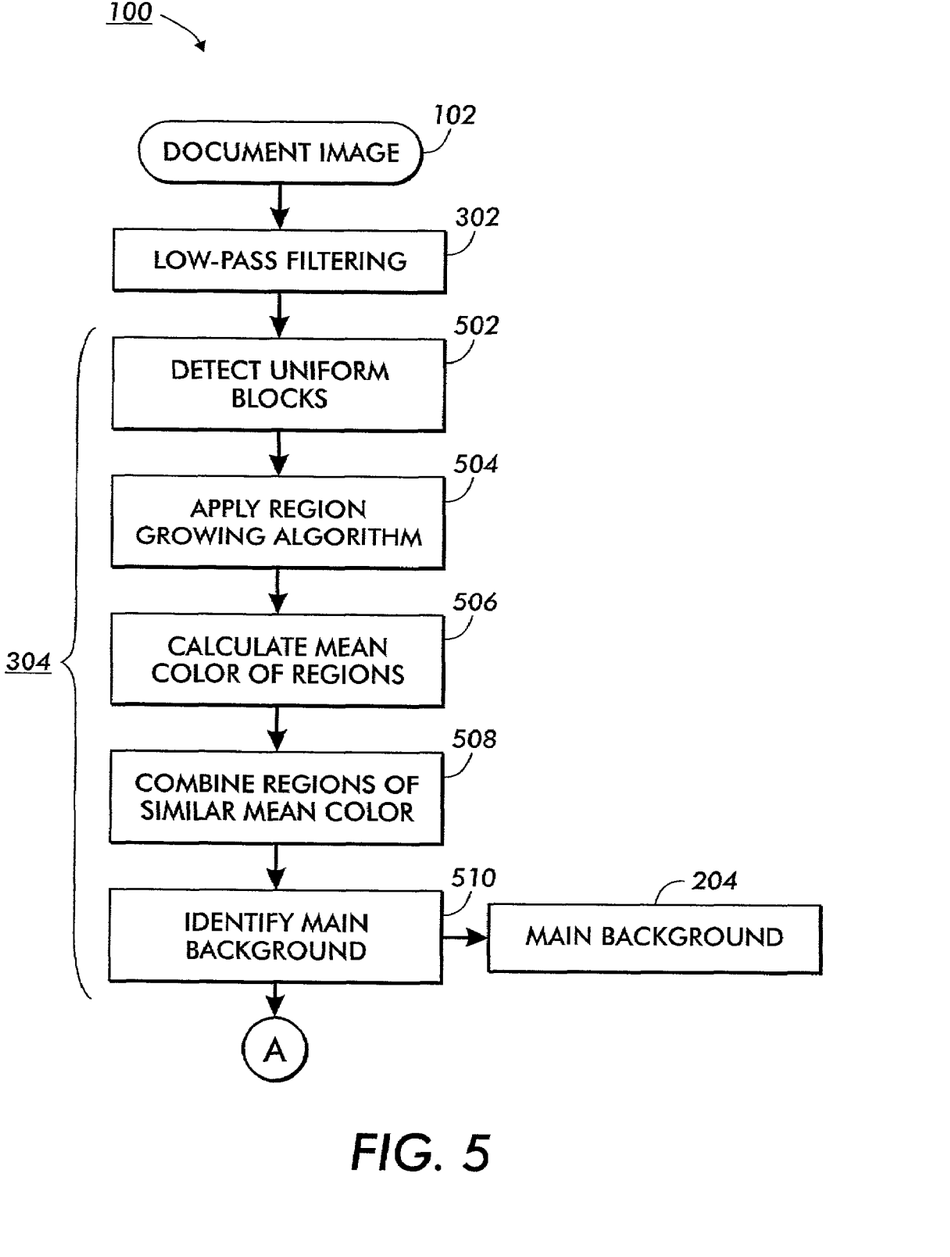
FIGS. 5–10 provide a detailed flowchart of the background-based segmentation process 100 of FIG. 1.

The main background is identified 304 in the decimated image by first identifying N×N uniform blocks 502. An N×N block is defined as a uniform block if the dynamic ranges of the three color channels are all less than a predetermined threshold. Next, a region-growing algorithm is applied 504, using the uniform blocks as seeds. Region growing is based on assessing the color difference of adjacent pixels. If a first pixel is adjacent to a second pixel in a region and the color difference between the two pixels is less than a predetermined threshold, the first pixel is marked as belonging to the region. The mean color of each region grown is calculated 506, and regions of similar mean color are combined 508. Finally, among all the grown regions, the one with the largest bounding area is identified as the main background 510.

Figure 6:
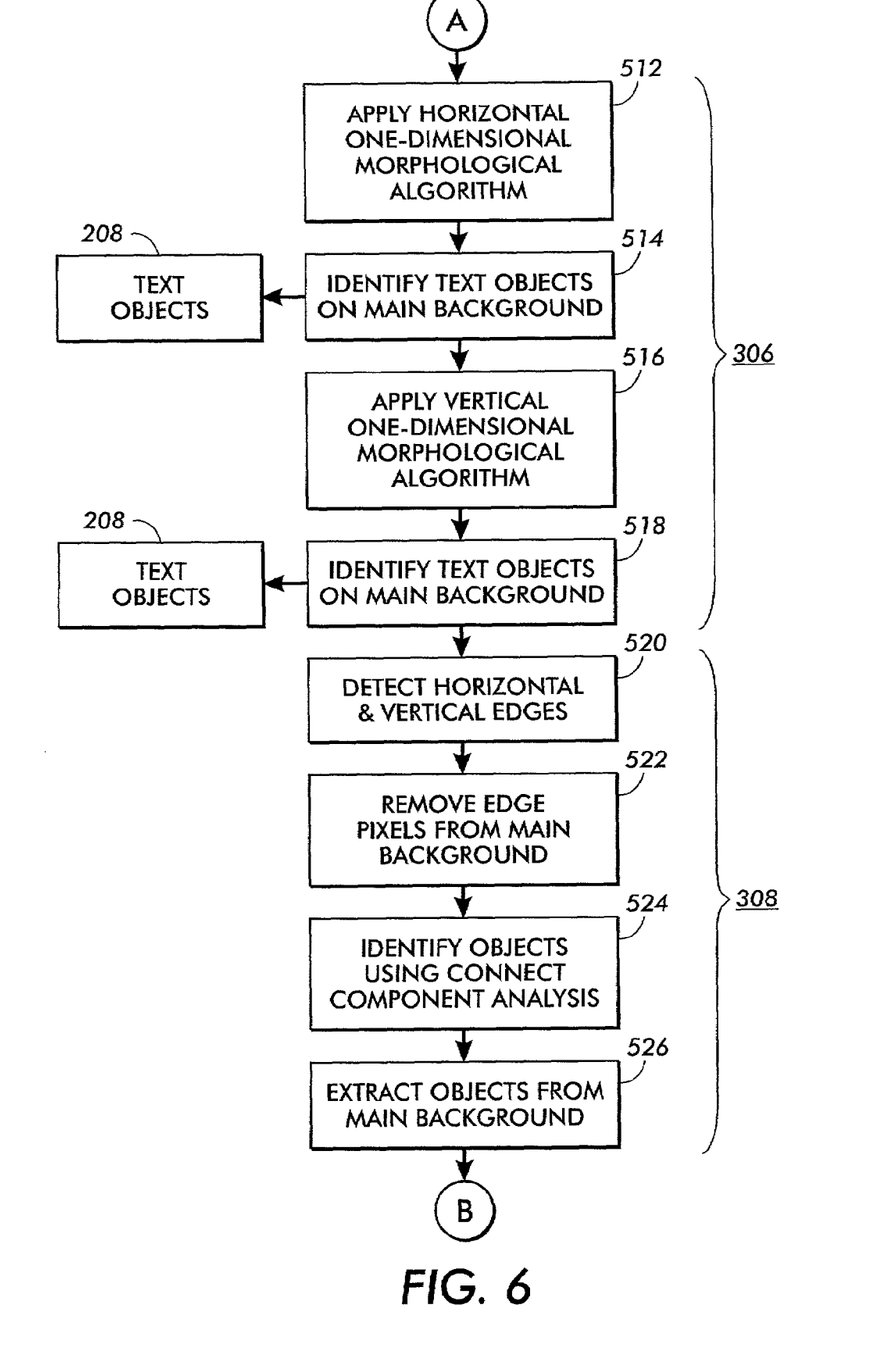

With reference to FIG. 6, small dimensions and strong boundaries are normally characteristics of text objects. Nevertheless, this definition includes thin lines, icons and small structures as well as most text. For image processing applications such as compression, this treatment is generally acceptable. Given the above definition, the text on the main background is extracted by two 1-dimensional morphological operations (i.e., openings). A 1-dimensional morphological opening is applied in the horizontal direction 512 to identify text objects on the main background 514. Similarly, a 1-dimensional morphological opening is applied in the vertical direction 516 to identify additional text objects on the main background 518. The sizes of the structuring elements are determined by the maximal width of the text strokes that need to be extracted.

After the main background 204 and text objects 208 on the main background are detected, what is left are objects with relatively large dimensions that require further analysis. Since multiple objects can be connected together, forming a complex composite object that is difficult to classify, it is desirable to separate objects as much and as early in the analysis stage as possible. Individual objects are often bordered with long edges. Therefore, edges in both the vertical and horizontal directions are detected 520 and the edge pixels are removed from the main background 522. Objects on the main background are identified using a connect component analysis 524 to connect the removed edges. The objects identified on the main background are extracted 526 for further analysis.

Figure 7:
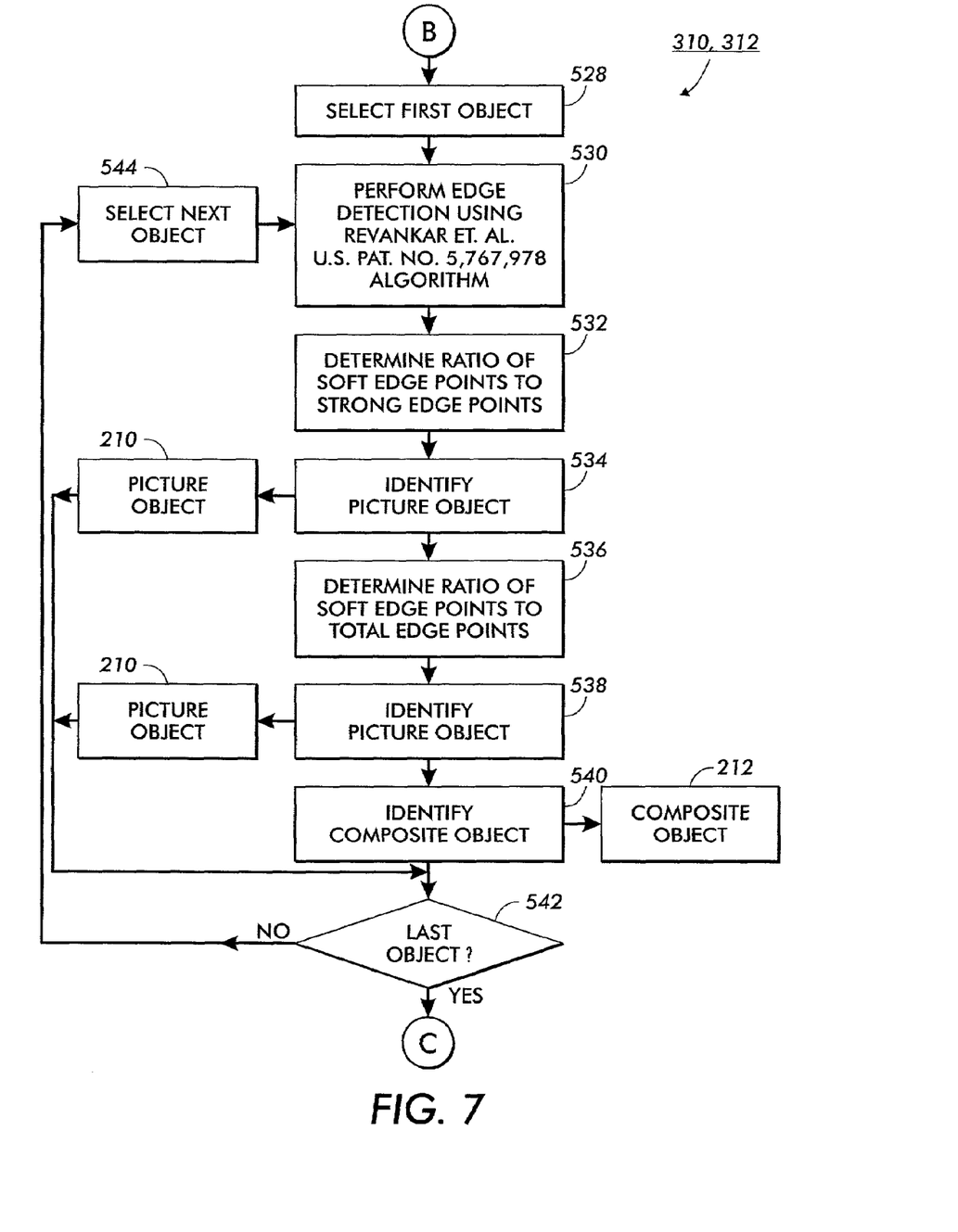

With reference to FIG. 7, the objects identified on the main background, in addition to and separate from the text objects, are either picture objects or composite objects. Next, each object is analyzed and classified. A first object is selected for analysis 528. Edge detection, in one embodiment, is performed on the object using the edge detection algorithm in U.S. Pat. No. 5,767,978 to Revankar et al. ("Revankar") 530. Under Revankar, soft edge points and strong edge points are identified and the ratio of soft edge points to strong edge points is determined 532. If the ratio is larger than a predetermined threshold, the object is classified as a picture object 534 and the analysis advances to 542; otherwise, the analysis continues to 536. At 536, also under Revankar, the ratio of soft edge points to the total number of edge points is determined. Likewise, if the ratio is larger than a predetermined threshold, the object is classified as a picture object 538 and the analysis advances to 542; otherwise, the analysis continues to 540. At 540, the object is classified as a composite object and the analysis continues to 542.

At 542, the process determines whether the current object is the last of the objects extracted from the main background. If the current object is the last object, the process moves on to analyze composite objects; otherwise, the next object is selected 544 and the edge detection process is repeated until the last object is classified.

Figure 8:
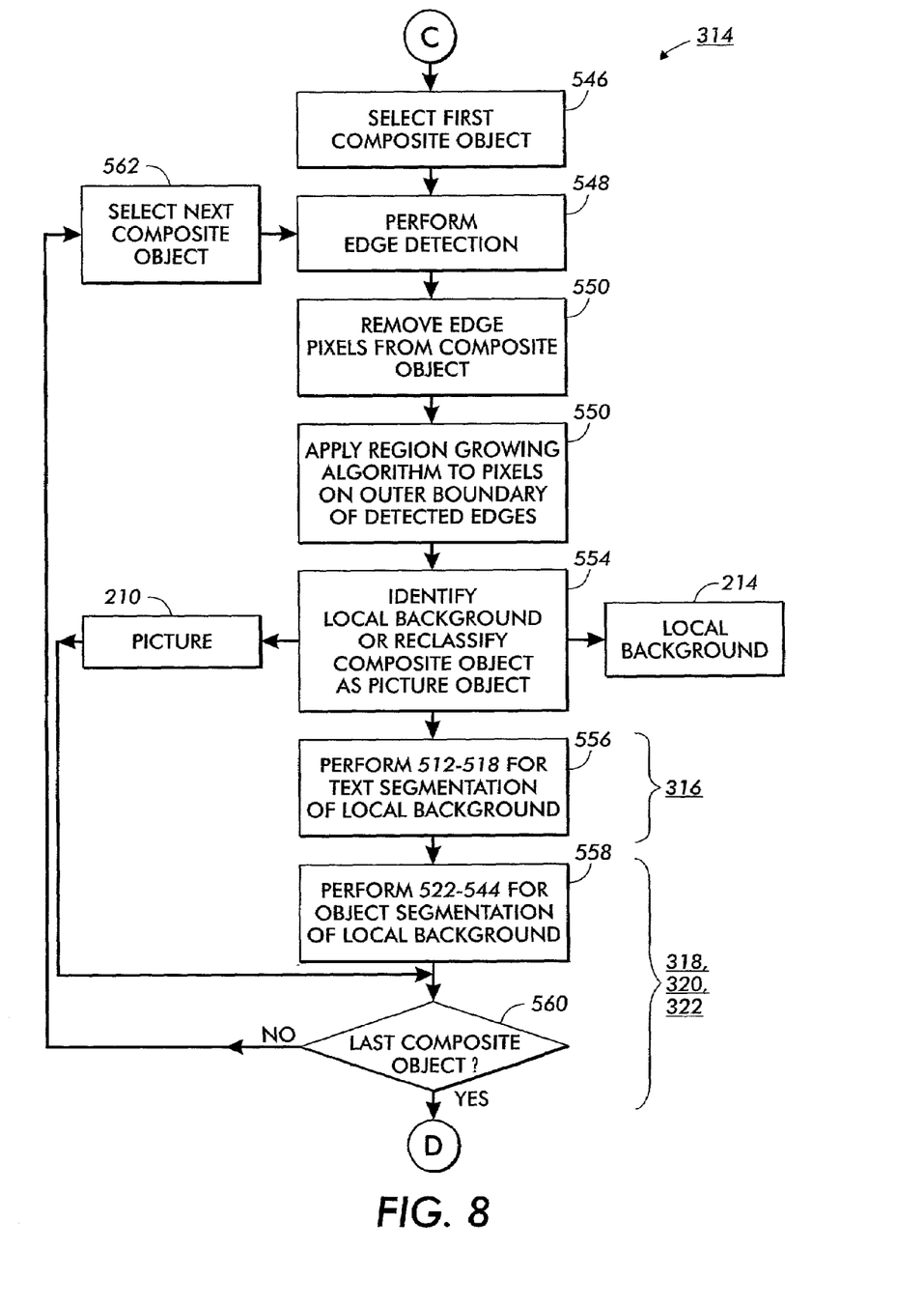

With reference to FIG. 8, a composite object is different from other types of objects because it has its own background, often referred as a local background. Analysis of a composite object is similar to analysis of the whole image 102. Analysis of composite objects includes the following three steps: (1) local background identification; (2) text segmentation and classification; and (3) object segmentation and classification between picture and composite object classes. Among the three steps, text segmentation and object segmentation are identical to the process described above for analysis of the whole image 102. However, identification of the local background is different from identification of the main background.

Next, each composite object is analyzed, segmented, and classified. A first composite object is selected for analysis 546. Edge detection is performed on the composite object using a standard edge detector 548 and the edge pixels are removed from the composite object 550. Next, using each pixel on the outer boundary of the removed edges as a seed, a region-growing algorithm is applied 552. If the color difference between an adjacent pixel and a region is less than a predetermined threshold, the adjacent pixel is marked as belonging to the region. If the largest region grown has dimensions larger than a predetermined threshold, it is identified as the local background; otherwise, the composite object is reclassified as a picture object 554. If the composite object is reclassified as a picture object 210, the analysis advances to 560; otherwise, analysis of the composite object continues to 556.

At 556, the text objects on the local background are identified, segmented, and classified. This is accomplished in the same manner that text objects on the main background were identified, segmented, and classified. Therefore, 512–518 are performed for the composite object. Upon completion of 518, the analysis returns to 558.

At 558, other objects on the local background are also identified, segmented, and classified in either picture or composite object classes. This is accomplished in the same manner that other objects on the main background were identified, segmented, and classified. Therefore, 520–544 are performed for the composite object. Note that 530–544 are repeated for each object identified on the local background. After the last object identified on the local background is classified, the analysis returns to 560.

At 560, the process determines whether the current composite object is the last composite object identified. If so, the process moves on to the original-resolution refinement stage 106 (FIG. 1); otherwise, the next composite object is selected 562 and the composite object analysis (i.e., 548–560) is repeated until the last composite object is segmented.

Figure 9:
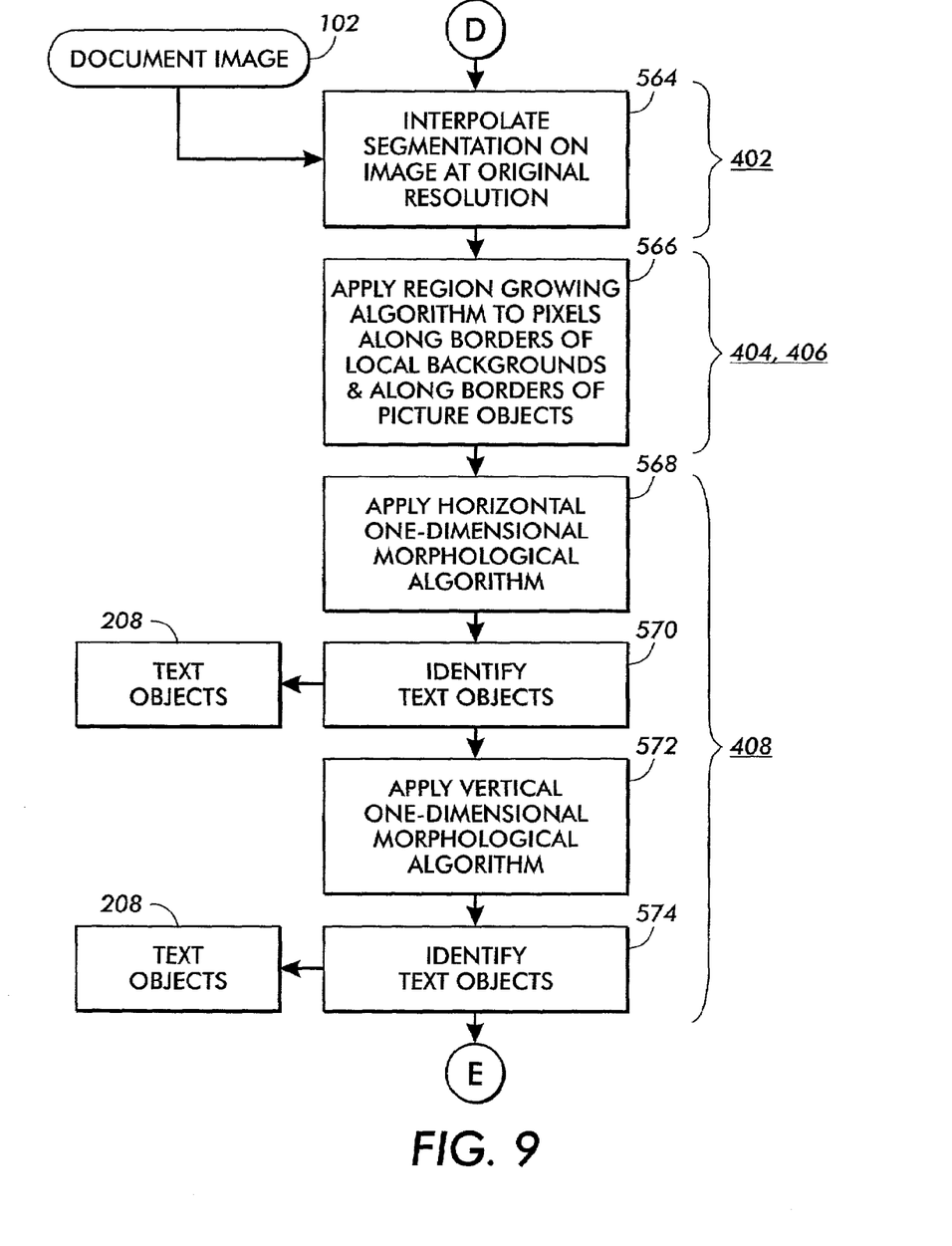

With reference to FIG. 9, during original-resolution refinement stage 106, also referred to as the high-resolution processing, the detected main and local backgrounds identified during low-resolution segmentation 104 are refined and further tested. Refinement 106 begins by overlaying the segmentation and classification results of the low-resolution segmentation stage 104 on the original image 102. This is accomplished by interpolating the segmentation and classification results from low-resolution on the original resolution of the image 564. Next, a region-growing algorithm, based on color similarity, is applied to the pixels along the border of each local background and each picture object 566. Region growing refines the borders with respect to the main background and other adjacent backgrounds and objects at the original resolution.

After the borders are refined, algorithms are used to identify text objects based on the typical small dimensions and strong boundaries of text objects. All structures that have at least one dimension smaller than a predetermined threshold are identified as text objects. A 1-dimensional morphological opening is applied in the horizontal direction 568 to identify text objects 570. Similarly, a 1-dimensional morphological opening is applied in the vertical direction 572 to identify additional text objects 574. Each identified text object is also segmented and classified as a text object 208.

Figure 10:
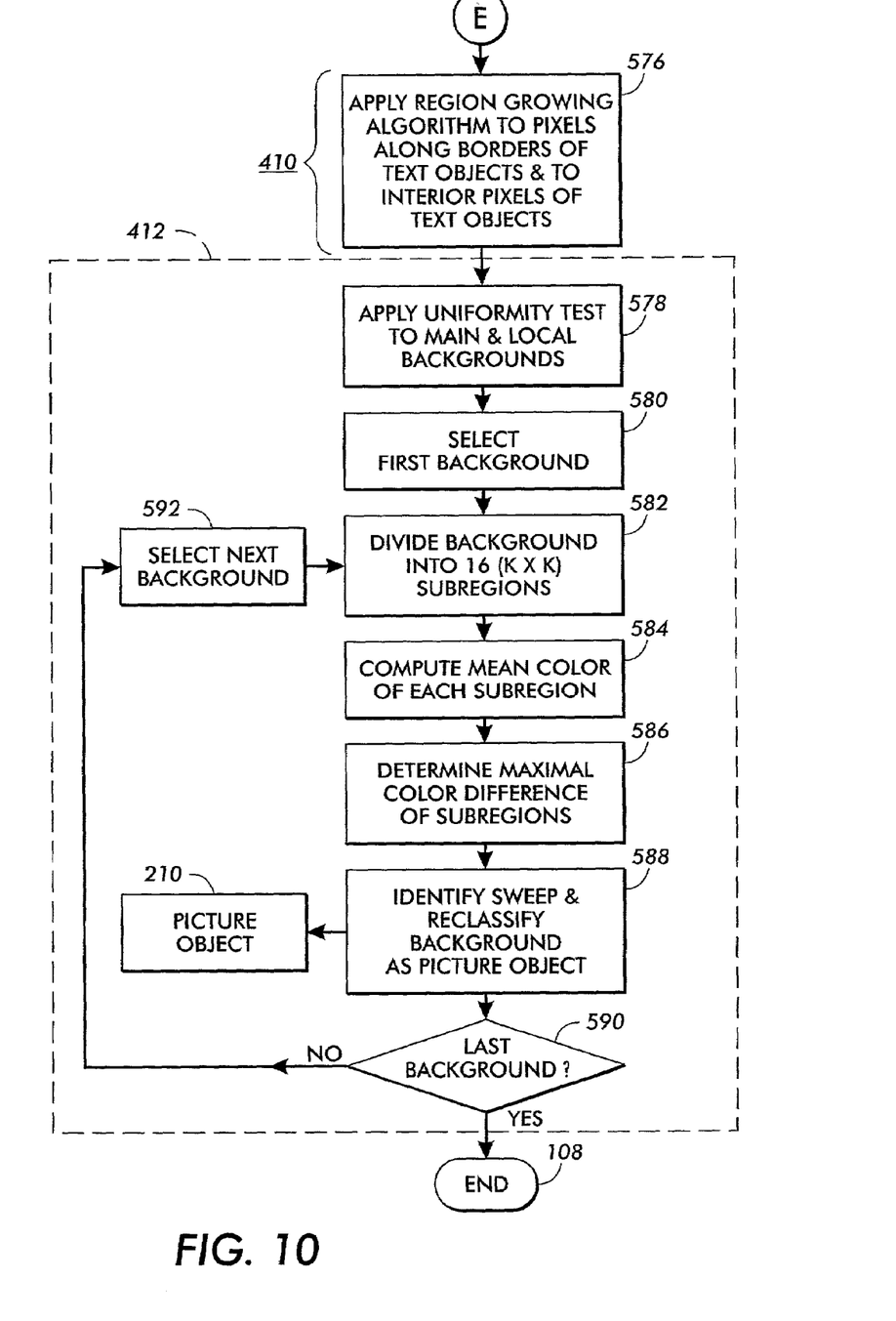

With reference to FIG. 10, once text objects 208 are identified, segmented, and classified, a region-growing algorithm is applied to the pixels along the border and interior areas of each text object 576. Region growing refines the borders with respect to the main background 204, local backgrounds 214, and other objects that the text overlays and identified interior areas surrounded by text character strokes (e.g., the middle portion of "o") at the original resolution. After refinement of the text objects, a more accurate text mask exists.

An optional refinement is the reassessment of each background to determine if it is a sweep 412. If maintaining the gradient characteristics of sweeps is important, the option 412 should be included. If the option 412 is not included, the background will reflect the mean color for its area. If the option 412 is implemented, any background identified as a sweep is reclassified as a picture object and continues to reflect its gradient characteristics. If a low risk approach is preferred, the option 412 should be included.

When the option 412 is implemented, a background uniformity test is applied to the main background and each local background 578. A first background is selected for analysis 580. The background is divided into sub-regions based on a K×K arrangement for the total bounding area 582. Experimentally, K=4 was used. The mean color of each sub-region is computed 584. The maximal color difference between all of the sub-regions is determined 586. If the maximal color difference is larger than a predetermined threshold, the background is reclassified as a picture object; otherwise, it remains identified as a background segment 588. Next, the process determines whether the current background is the last background 590. If the current background is the last background the refinement 106 stage is complete and the segmentation process 100 is at its end 108 (FIG. 1); otherwise, the next background is selected 592 and the uniformity test is repeated until the last background is reassessed.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An image segmentation process comprising the following steps:
   a) segmenting an image into a main background, a first local background, and a first object, wherein the first object is on either the main background or the first local background;
   b) classifying the first object into one class of a group of classes consisting of a text object, a picture object, and a composite object;
   c) if the first object is classified as a composite object, identifying a second local background for the first object; and
   d) segmenting a next object on the second local background.

2. The process set forth in claim 1, further comprising the following steps:
   e) classifying the next object into one class of a group of classes consisting of a text object, a picture object, and a composite object; and
   f) if the next object is classified as a composite object, performing steps c) through e) for the next object.

3. The process set forth in claim 1, step a)further comprising the following steps:
   e) identifying one or more block of pixels in the image, wherein the dynamic ranges of each of the three color channels are less than a predetermined threshold for the block;
   f) applying a region growing algorithm to each uniform block, wherein adjacent pixels with a color difference from the uniform block less than a predetermined threshold are marked as belonging to the region;
   g) calculating a mean color for each grown region;
   h) combining regions of similar mean color; and
   i) identifying the region with the largest bounding area as the main background for the image.

4. The process set forth in claim 1, step a) further comprising the following steps:
   e) detecting edges in the main background in both vertical and horizontal directions;
   f) removing the edge pixels from the main background;
   g) identifying a non-text object on the main background using a connect component analysis; and
   h) segmenting the non-text object on the main background.

5. The process set forth in claim 1, wherein the first object is classified as a composite object, step c) further comprising the following steps:
   e) detecting edges in the first object;
   f) removing the edge pixels from the first object;
   g) applying a region growing algorithm to each pixel on the outer boundary of the removed edge pixels, wherein adjacent pixels with a color difference from the region less than a predetermined threshold are marked as belonging to the region; and
   h) identifying the region with the largest bounding area;
   i) comparing the dimensions of the largest region to a predetermined threshold; and
   j) if the dimensions of the largest region are greater than the predetermined threshold, identifying the region as the second local background for the first object, otherwise, reclassifying the first object as a picture object.

6. The process set forth in claim 2, steps d) and e) further comprising the following steps:
   g) applying a one-dimensional morphological algorithm to the second local background in the horizontal direction to segment the next object and classifying the next object as a text object if the width of the elements detected by the algorithm is less than a maximal width; and
   h) applying a one-dimensional morphological algorithm to the second local background in the vertical direction to segment the next object and classifying the next object as a text object if the width of the elements detected by the algorithm is less than a maximal width.

7. The process set forth in claim 1, step d) further comprising the following steps:
   e) detecting edges in the second local background in both vertical and horizontal directions;
   f) removing the edge pixels from the second local background; and
   g) segmenting the next object on the second local background using a connect component analysis.

8. A method for segmenting an image, comprising the following steps:
   a) identifying a main background for the image;
   b) identifying a first object on the main background;
   c) classifying the first object into one class of a group of classes consisting of a text object, a picture object, and a composite object;
   d) if the first object is classified as a composite object, identifying a local background for the first object;
   e) if the first object is classified as a composite object, identifying a second object on the local background; classifying the second object into one class of a group of classes consisting of a text object, a picture object, and a composite object; and if the second object is classified as a composite object; identifying a local background for the second object.

9. The method set forth in claim 8, further comprising the following steps:
   h) if the second object is classified as a composite object, identifying a third object on the local background of the second object;
   i) classifying the third object into one class of a group of classes consisting of a text object, a picture object, and a composite object; and
   j) if the third object is classified as a composite object, identifying a local background for the third object.

10. The method set forth in claim 8, further comprising the following steps:
    i) if the second object is classified as a composite object, identifying a third object on the local background of the second object;
    j) classifying the third object into one class of a group of classes consisting of a text object, a picture object, and a composite object; and
    k) if the third object is classified as a composite object, identifying a local background for the third object.

11. A method for segmenting an image, comprising the following steps:
    a) identifying a main background for the image;
    b) identifying a first object on the main background;

c) classifying the first object into one class of a group of classes consisting of a text object, a picture object, and a composite object; and
d) if the first object is classified as a composite object, identifying a local background for the first object;
e) if the first object is classified as a composite object, determining if the dimensions of the local background of the first object are greater than a predetermined threshold; and
f) if the dimensions are not greater than the predetermined threshold, reclassifying the first object as a picture object.

* * * * *